Sept. 15, 1970  F. RIEMERSCHMID  3,528,247
EXHAUST SYSTEM FOR VTOL AIRCRAFT
Filed March 11, 1968  4 Sheets-Sheet 2
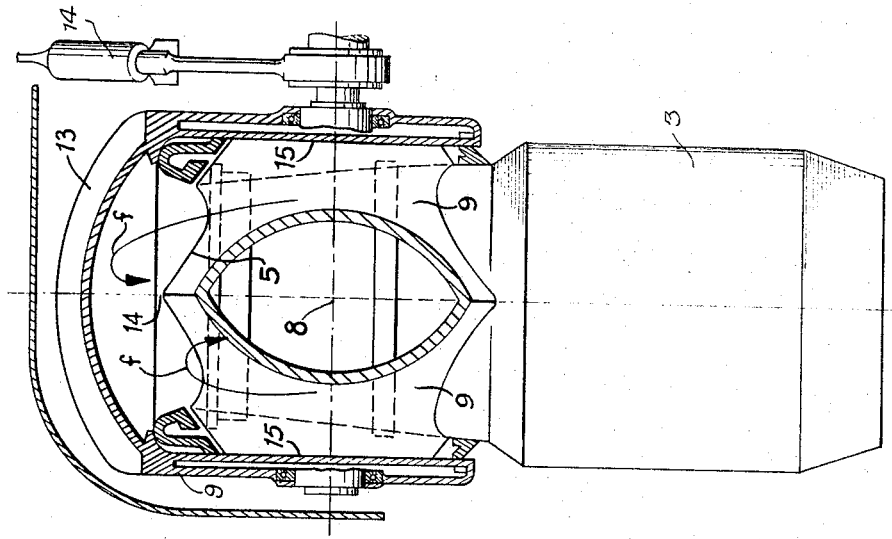
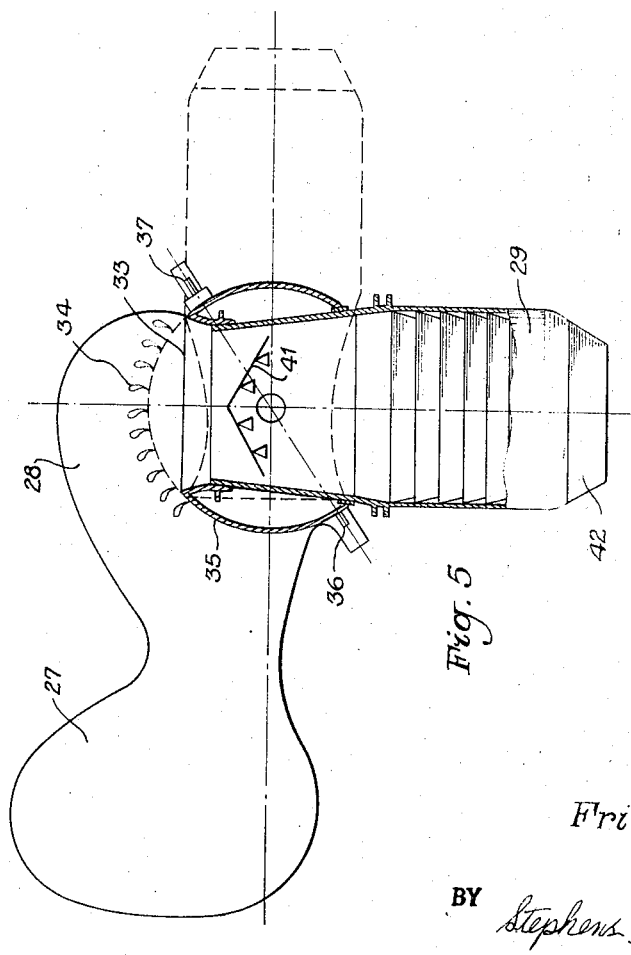
INVENTOR
*Fritz Riemerschmid*
BY *Stephens, Huettig and O'Connell*
ATTORNEYS Sept. 15, 1970                F. RIEMERSCHMID                3,528,247
                        EXHAUST SYSTEM FOR VTOL AIRCRAFT
Filed March 11, 1968                                      4 Sheets-Sheet 3
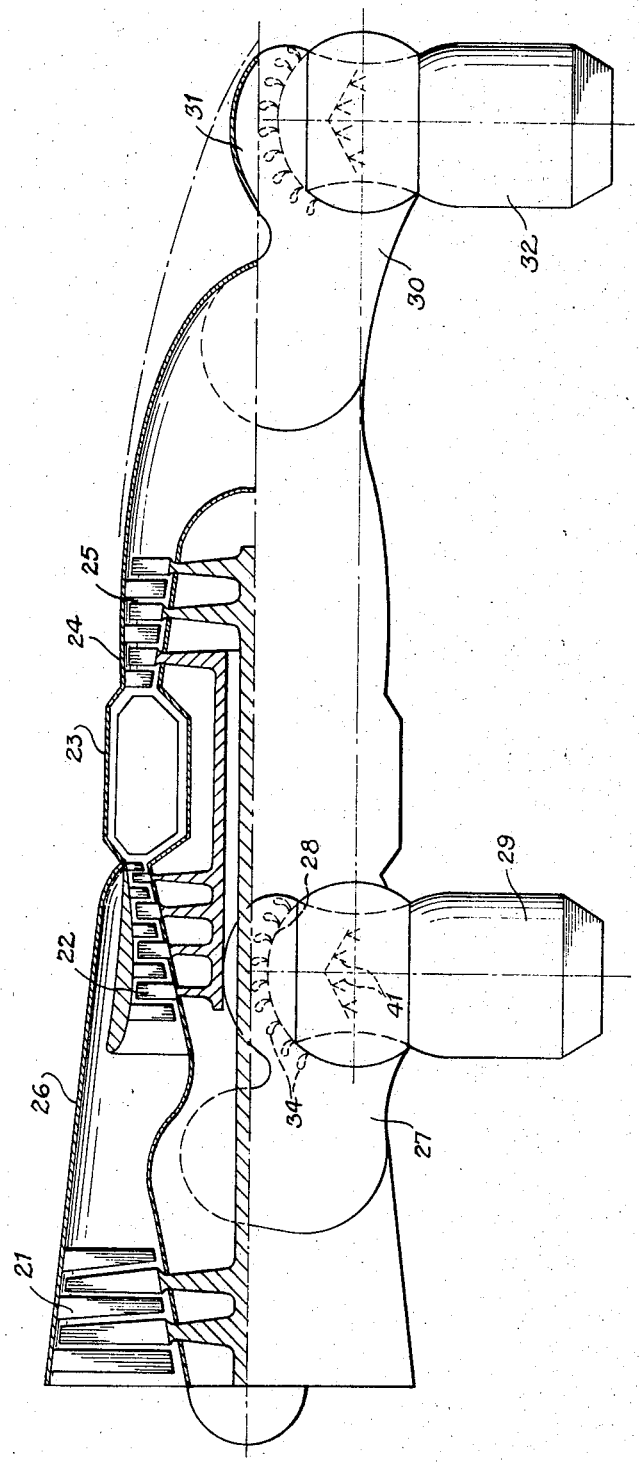
INVENTOR
*Fritz Riemerschmid*
BY
*Stephens, Huettig and O'Connell*
ATTORNEYS

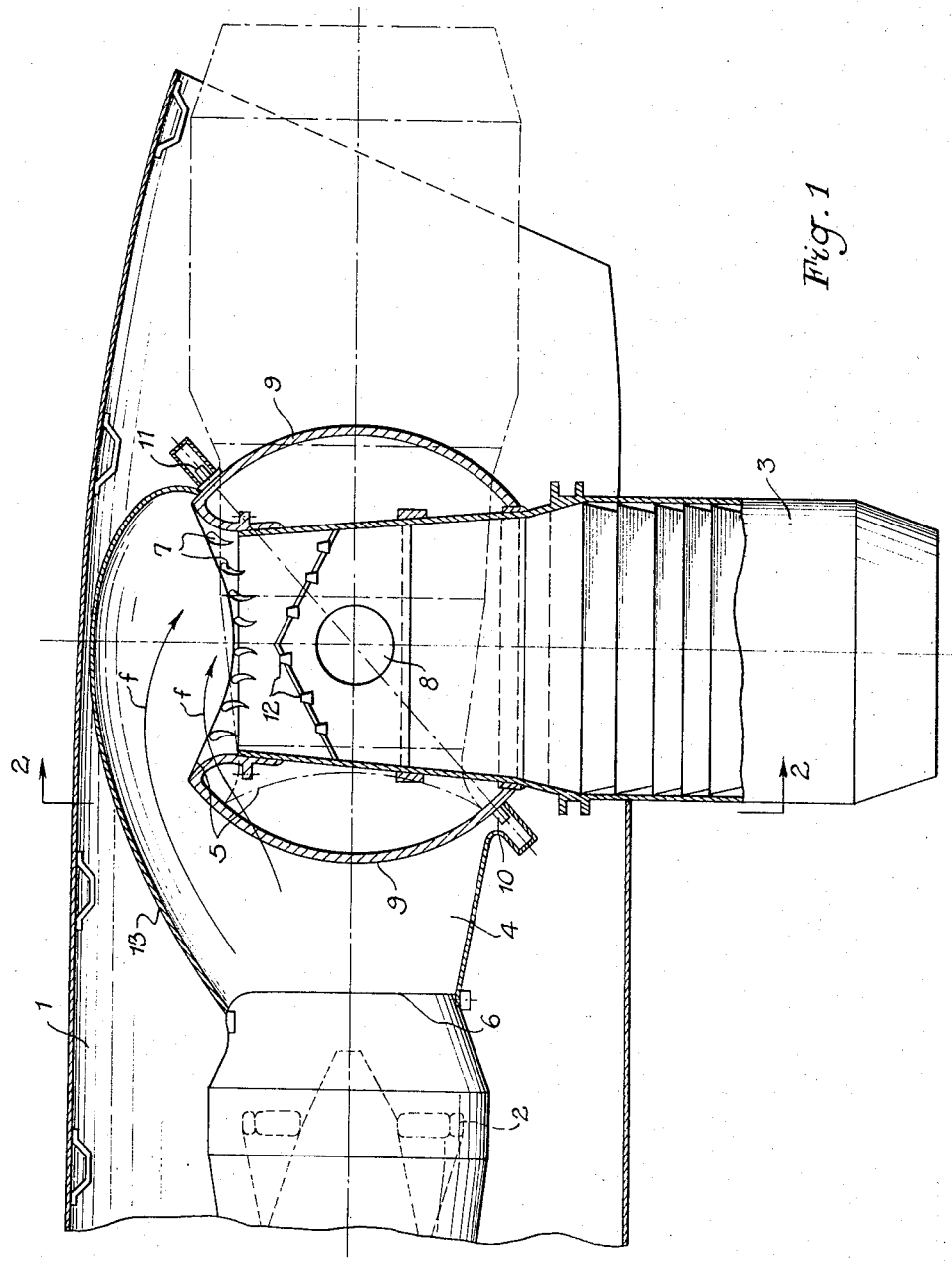

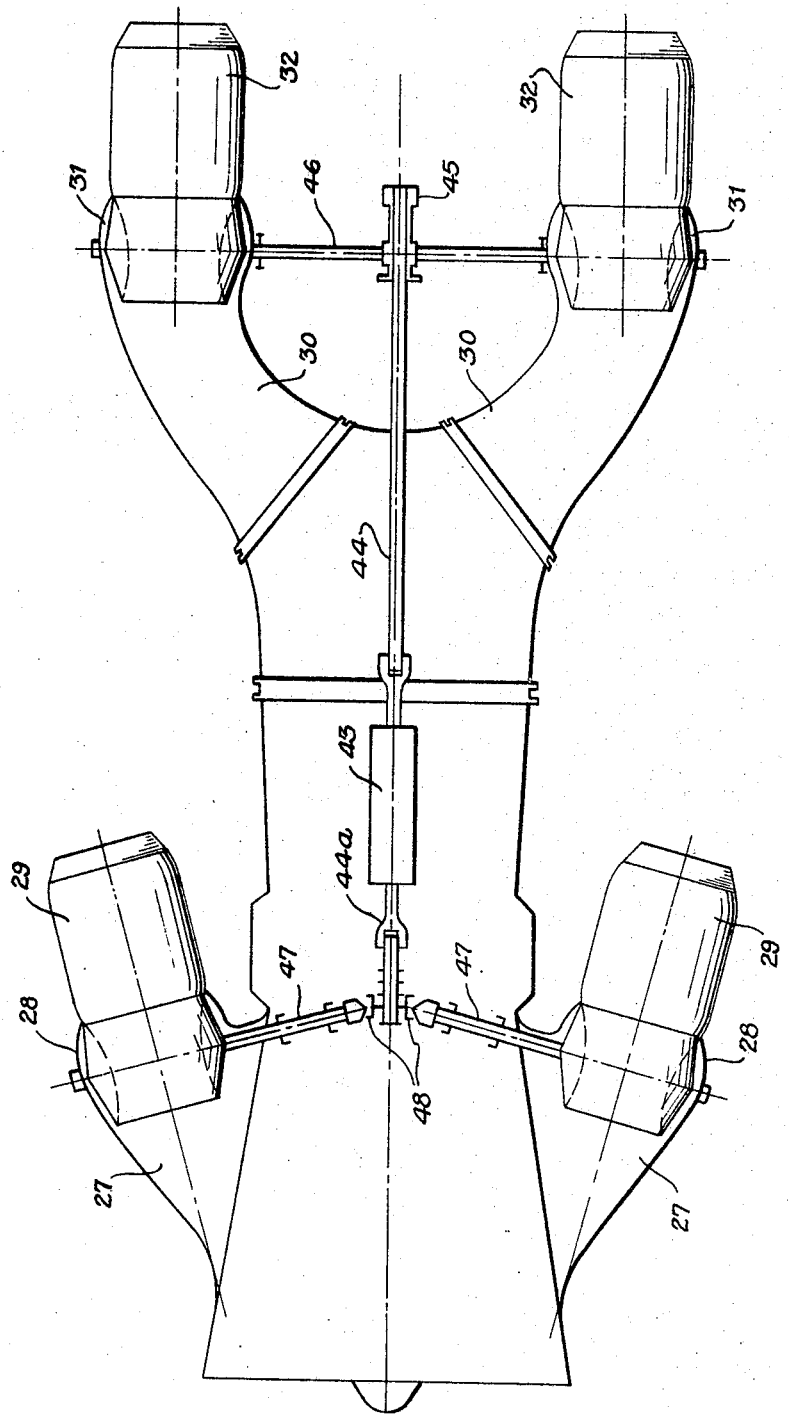

United States Patent Office 3,528,247
Patented Sept. 15, 1970

3,528,247
EXHAUST SYSTEM FOR VTOL AIRCRAFT
Fritz Riemerschmid, Starnberg, Germany, assignor to Motoren- und Turbinen-Union, Munich, Germany
Filed Mar. 11, 1968, Ser. No. 712,237
Claims priority, application Germany, Mar. 17, 1967,
M 73,226
Int. Cl. F02k 1/20; B64c 15/06
U.S. Cl. 60—232                                    4 Claims

ABSTRACT OF THE DISCLOSURE

The exhaust gas jet pipe is connected to the turbine through a chamber having a bulge positioned above the turning axis of the jet pipe. The bulge provides a space through which exhaust gases can flow without essential flow loss when the jet pipe is in position for vertical flight of an aircraft.

---

This invention relates to an aero jet engine exhaust arrangement incorporating a chamber for receiving the engine gases and a jet pipe, with or without additional combustion equipment, swivellably mounted on said chamber.

In a known system as disclosed in U.S. Pat. No. 3,053,477, the horizontally arranged engine is provided with a fixed bent deflector casing fitted to the rear end in which is located a jet pipe that can be swivelled around a lateral axis below the engine. The upstream end of the jet pipe is provided with a bend corresponding to the bend at the engine rear end and when the jet pipe is swivelled to one end position as for jet assisted flight the bend joins at the deflector casing whilst in the other end position of the jet pipe as for horizontal flight it slides over the deflector casing like a telescope. The main disadvantages of this system are that the jet pipe cannot be swivelled into a vertical position and, consequently, real vertical flight is not possible, and that when such a system is installed in an aircraft the jet pipe would protrude relatively far from the lower bottom of the aircraft fuselage. This results in ground erosion and the associated often serious consequences. This is particularly the case in systems where the engine exhaust gases are afterburned within the jet pipe.

A further disadvantage of this system is that, for mechanical design reasons, the jet pipe will always have a position pointing slightly downward to the rear in its end position for horizontal flight. This results in losses of engine efficiency during horizontal flight.

In this known arrangement, convex staggered deflector vanes are fixed within the deflector casing which is fixed to the engine rear end and within the upstream bend of the jet pipe. When the jet pipe is inclined downward, said deflector vanes assist the leading of the exhaust gases into said jet pipe. The exhaust gases of the engine must, however, also flow through these deflector vanes when the jet pipe is in the horizontal end position, which results in additional flow losses of the exhaust gases.

Similarly, it is already known that efforts are being made to have the axes of engine, jet pipe and swivelling shaft pass through one point. But this would result in even greater difficulties and flow losses, if the gases are required to be deflected by 90° or more.

The objects of this invention are to produce an exhaust system, particularly for aero jet engines, with a chamber in which a jet pipe with or without additional combustion equipment, which is swivellably mounted about a lateral axis in such a manner that, despite the simple principle of construction, the flow losses will be low both at a jet deflection of 90° and with no deflection of the gases, and that the jet pipe will not protrude too far from the lower bottom of the aircraft fuselage in a lateral direction.

In general, these objects are obtained by providing a chamber having a bulge and positioned above the swivelling axis, that serves the purpose of directing the gases into the jet pipe when it is swivelled into a lateral position.

The bulge of the chamber which forms part of the exhaust arrangement of this invention may be compared with a flow chamber of the type used in water turbines. When this exhaust arrangement is installed in an aircraft in connection with a turbojet engine arranged in horizontal position in the aircraft, and when the jet pipe is in a position transverse to the aircraft, the gases are led into the inlet of the jet pipe from the top under favorable flow conditions and hence without essential flow losses. In this manner, the leading of the gases is materially assisted by the expanded or enlarged portion of the chamber. In the end position for horizontal flight parallel to the longitudinal axis of the aircraft, the inlet of the jet pipe immediately joins the inlet of the chamber so that the gases may leave the jet pipe in a straight flow line without any material flow losses thus permitting pure horizontal flight.

This invention is applicable to any exhaust unit featuring a chamber in which a jet pipe allows for swivelling movements to be effected about a transverse axis, particularly, also with by-pass jet engines having lateral exhaust nozzles for compressor air and combustion gases. According to this invention, an exhaust system of this type is intended to be arranged, on either side of the engine, following the low-pressure compressor outlet for accepting part of its compressed by-pass air as well as one further corresponding exhaust unit on either side of the engine in the region of its last turbine stage for accepting the engine exhaust gases, where, furthermore, means for an additional combustion are to be provided in the jet pipes used for discharging both the by-pass air and the exhaust gases of the engine.

The exhaust unit according to this invention is particularly suited for an arrangement in the fuselage end of an aircraft, because it is especially in this area that the usable space is limited due to the ratio of slenderness of the fuselage contour desired.

According to a further advantageous embodiment of this invention, the outer wall of the jet pipe features conical surfaces, substantially, in the swivelling area within the chamber. This jet pipe configuration will allow for one portion of the engine gases to enter the jet pipe inlet from the top in a lateral direction by means of the conical surfaces at the outer wall of the jet pipe, when the latter is in a vertical position, while the remaining portion of the gases is passed directly into the jet pipe inlet from the top with the aid of the bulge provided in the chamber and the cone panels.

For this reason, it will be possible to reduce the size of the chamber upper bulge associated with the exhaust unit according to this invention, so that the chamber may be moved farther upstream into the fuselage of the aircraft by the amount saved by reducing its installation height. This feature similarly results in a new position of the swivelling axis of the jet pipe being farther moved upstream into the fuselage of the aircraft, so that the ground clearance of the final nozzle will become larger, when the jet pipe is swivelled into a vertical final position for generating a vertical thrust component, thus reducing the danger of ground erosion particularly occurring due to the hot, high-energy gas jets, when additional afterburning is used.

In a further embodiment of this invention, the conical surfaces represent parts of the lateral areas of two similar truncated cones which, in the vertical longitudinal medium plane, are connected with one another at their maximum diameter, from where they taper in the direction of the lateral swivelling bearing of the jet pipe, while being concentrically arranged about the swivelling axis of the jet pipe, whereby the jet pipe is passed symmetrically through the conical surfaces up to its inlet.

The conical surfaces form an additional reinforcement for the upstream jet pipe and, in its developed form, they can be manufactured without any major difficulties and thus at low cost.

According to this present invention, furthermore, straight sealing strips are arranged within the chamber walls for sealing the joints between the walls of the chamber and the conical surfaces of the jet pipe; and the contact surfaces of the sealing strips will rest upon the conical surfaces in any swivelling position of the jet pipe.

In order to ensure that a uniform flow pattern is maintained when the exhaust gases pass into the interior of the jet pipe, a row of guide vanes is arranged in the region of the jet pipe inlet.

In a further embodiment of this invention the flameholder provided for additional heating of the engine gases within the jet pipe is arranged above the swivelling axis.

The means by which the objects of this invention are obtained are described more fully with reference to the accompanying drawings in which:

FIG. 1 is a longitudinal sectional view through part of the rear end of an aircraft incorporating one embodiment of this invention;

FIG. 2 is a cross-sectional view taken along the line 2—2 in FIG. 1;

FIG. 3 is a side view, partly in cross-section, showing a by-pass turbojet engine equipped with the exhaust units;

FIG. 4 is a bottom view of FIG. 3; and

FIG. 5 is a schematic side view showing an exhaust unit in two swivelling positions.

In the fuselage 1 of an aircraft is a turbojet engine composed of a compressor, combustion chamber and turbine 2 arranged in series. Jet pipe 3 consisting essentially of a cylinder with a straight longitudinal axis is joined to turbine 2 through a chamber 4. In one of its extreme positions, with its longitudinal axis approximately parallel to the engine longitudinal axis, for instance, during cruise flight, the jet pipe 3 with its inlet 5 joins the gas outlet 6 formed by the engine casing, so that the engine exhaust gas will pass into the jet pipe 3 on a direct path in a horizontal direction, as shown by the dash-dot line position of jet pipe 3 in FIG. 1. When jet pipe 3 is swivelled by 90° from the position approximately parallel to the engine longitudinal axis into the vertical position about axis 8, then the engine exhaust gases will first pass into collector chamber 4 in a horizontal direction and then, essentially assisted by part of the conical surfaces or walls 9, into the inlet 5 of jet pipe 3 in a lateral direction and from the top, following the flow pattern of the engine exhaust gases as indicated by the arrows f in FIGS. 1 and 2. The conical surfaces 9 represent lateral surfaces of two similar conical frustra, the common rotation axes of which together forming the swivelling axis 8 of jet pipe 3, FIG. 2. The chamber 4 embraces the conical surfaces 9 of the jet pipe with its lateral walls. Sealing of the conical surfaces 9 of jet pipe 3, relative to the stationary side walls of chamber 4 is effected by straight sealing strips 10, 11, whose contact lines rest upon the conical surfaces 9. In the interior of inlet 5 of jet pipe 3 inlet guide vanes 7 are arranged, FIGS. 1 and 2, in order to ensure that a uniform flow of the engine exhaust gases into the interior of jet pipe 3 is maintained, particularly towards the flameholder 12 provided for additional afterburning in the pipe. Bulge 13 in chamber 4 is positioned above axis 8 and provides a space through which gases flow without essential flow loss when jet pipe 3 is in vertical position.

The conical surfaces or walls 9 form an arcuate leading edge 14, and said walls have bearing ends 15.

The by-pass engine according to FIG. 3 features a low-pressure compressor 21, a high-pressure compressor 22, a combustion chamber 23, a high-pressure turbine 24, and a low-pressure turbine 25. Part of the air compressed by low-pressure compressor 21 is supplied to high-pressure compressor 22 for further compression, and hence heating in combustion chamber 23, and finally for driving gas turbines 24 and 25.

The remaining portion of the air delivered by low-pressure compressor 21 is discharged from annulus 26 into manifolds 27, FIGS. 3 and 4, flanged to the annulus, the manifolds terminating in chamber 28. The basically cylindrical jet pipes 29 project into these chambers 28.

The gas having passed through low-pressure and high-pressure turbines 24 and 25, respectively, enters a bifurcated duct joining the end of the engine, the two arms of the duct 30, FIG. 4, also terminating in chambers 31 joined to either jet pipe 32.

FIG. 5 represents an enlarged view of said exhaust unit which, in this case, serves the purpose of accepting a portion of the air delivered by low-pressure compressor 21, and having the same function and structure as the other exhaust units, further details of the aforementioned unit being described as follows.

In one of its positions, when its longitudinal axis is approximately parallel to the longitudinal axis of the engine, jet pipe 29 with its mouth 33 joins manifold 27; that portion of the air compressed by low-pressure compressor 21, but not passed to both combustion chamber and turbine, is discharged into manifold 27 and hence into jet pipe 29, following an essentially direct path. Upon swivelling from this position by 90°, mouth 33 is located downstream of a row of guide vanes 34 assisting in deflecting the compressor air from the flow direction parallel to the longitudinal axis of the engine to flow direction parallel to the longitudinal axis of the jet pipe.

According to the invention, jet pipe 29 features laterally arranged, conical guides 35 in the region of chamber 28 joining manifold 27, whereby the guides will serve the purpose of assisting in the guidance of the compressor air to vanes 34 when jet pipe 29 has reached one of its end positions, while they are located downstream of vanes 34 and closing same in the other end position of jet pipe 29. Chamber 28 joining manifold 27 features sections shaped conically to suit the guides of jet pipe 29. Guides 35 should preferably also serve as mating surfaces for seals 36, 37 provided on the chamber walls for swivelling of jet pipe 29 through the wall of chamber 28 joining manifold 27. Flameholder 41 is used for additional combustion in qet pipe 29. The final nozzle 42 is at the end of jet pipe 29.

Swivelling of all four jet pipes, FIG. 4, is effected by a common, pneumatically actuated pressure reverser 43 located underneath the engine and the piston of which actuates, via rod 44, a lever 45 which in turn is rigidly connected to an axle 46 used for the attachment of the two rear jet pipes 32. At the same time, the piston of pressure reverser 43 actuates a corresponding linkage with rod 44a for the swivelling of the two front jet pipes 29, their angular position relative to the longitudinal axis of the engine, however, requiring two axles 47 rigidly attached to the jet pipes and being connected to each other by universal joints 48. If required, the swivelling mechanism may be supported on the aircraft in order to prevent any control forces to be transmitted to the engine.

Having now described the means by which the objects of this invention are obtained,

I claim:

1. An exhaust gas deflecting arrangement for a turbojet engine of an aircraft comprising in flow series compressor means, combustion means and turbine means, a chamber (4) fixed to said engine and communicating with at least one of said means, exhaust gas flow deflecting means comprising a straight exhaust jet pipe pivotally mounted in said chamber on an axis transverse to the gas flow within said chamber for swivelling from a horizontal position downwardly into a vertical position, a bulge in said chamber in the area of the gas inlet end of said jet pipe for leading the flow of gas into said jet pipe when in vertical position, and an afterburner flameholder mounted in said jet pipe above said axis.

2. An arrangement as in claim 1, said gas flow deflecting means further comprising conical walls concentric with said axis and forming an arcuate leading edge when said jet pipe is in vertical position, said walls being tapered toward the bearing ends, respectively, of said axis for effecting a gas flow into said jet pipe through both said bulge from above and over both sides of said leading edge of said conical walls.

3. An arrangement as in claim 2, further comprising sealing strip means mounted in said chamber and bearing on said conical walls for forming a gas seal between said chamber and said jet pipe in any position of said pipe.

4. An arrangement as in claim 3, said jet pipe having a gas inlet end, and a row of guide vanes mounted on said inlet end.

References Cited

UNITED STATES PATENTS

| | | | |
|---|---|---|---|
| 525,487 | 9/1894 | Crawford | 285—184 XR |
| 2,486,272 | 10/1949 | Gazda. | |
| 2,912,188 | 11/1959 | Singelmann et al. | 60—226 XR |
| 3,053,477 | 9/1962 | Reiniger | 60—232 XR |
| 3,056,258 | 10/1962 | Marchant et al. | 60—232 XR |
| 3,063,241 | 11/1962 | Langfelder | 60—232 XR |
| 3,084,508 | 4/1963 | Olbrich | 60—232 |
| 3,290,885 | 12/1966 | Thomas | 60—232 XR |

MARK M. NEWMAN, Assistant Examiner

A. D. HERRMANN, Assistant Examiner

U.S. Cl. X.R.

60—261; 239—265.35; 244—12, 55; 285—184